(12) United States Patent
Chang (10) Patent No.: US 8,122,196 B2
(45) Date of Patent: Feb. 21, 2012

(54) SYSTEM AND PROCEDURE FOR RAPID DECOMPRESSION AND/OR DECRYPTION OF SECURELY STORED DATA

(75) Inventor: Ian Jen-Hao Chang, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 519 days.

(21) Appl. No.: 11/554,131

(22) Filed: Oct. 30, 2006

(65) Prior Publication Data

US 2008/0144826 A1 Jun. 19, 2008

(51) Int. Cl.
*G06F 12/00* (2006.01)
(52) U.S. Cl. .......... 711/137; 713/190; 713/189; 726/26; 380/28
(58) Field of Classification Search ............... 711/137; 713/190, 189; 726/26; 380/3, 4, 28, 103, 380/104
See application file for complete search history.

(56) References Cited

U.S. PATENT DOCUMENTS

| | | | |
|---|---|---|---|
| 6,792,544 B2 | 9/2004 | Hashem | |
| 6,851,056 B2 | 2/2005 | Evans | |
| 2002/0073324 A1 | 6/2002 | Hsu | |
| 2005/0021613 A1* | 1/2005 | Schmeidler et al. | 709/203 |
| 2007/0058801 A1 | 3/2007 | Plotkin | |
| 2007/0174634 A1 | 7/2007 | Plotkin | |
| 2008/0040538 A1* | 2/2008 | Matsuzawa et al. | 711/113 |

* cited by examiner

*Primary Examiner* — Midys Rojas
(74) *Attorney, Agent, or Firm* — Cesari and McKenna, LLP (57) ABSTRACT

A procedure and system reduces latency in restoring encrypted or compressed and encrypted data through a security appliance. The security appliance is coupled to a sequential access device and is configured to encrypt or compress and encrypt data provided by an initiator for secure storage on a sequential access device. To that end, the security appliance intercepts a read request issued by an initiator to access the data stored on the device, and forward the request to the device. Upon return of the requested data from the device, the security appliance restores (decrypts or decrypts and decompresses) the data prior to returning it to the initiator. The appliance also issues a "read ahead" (retrieve beyond the request) request to the device for predetermined amount of additional data for caching on the appliance. The appliance restores the read ahead data that is returned from the device and caches that additional data in memory in anticipation of one or more subsequent read requests for the data from the initiator.

20 Claims, 6 Drawing Sheets

SYSTEM AND PROCEDURE FOR RAPID DECOMPRESSION AND/OR DECRYPTION OF SECURELY STORED DATA

BACKGROUND OF THE INVENTION

1. Field of the Invention

The present invention relates to secure storage in a storage system, and more specifically, to a system for rapidly restoring data that was encrypted or compressed and encrypted by a security appliance.

2. Background Information

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize information as a hierarchical structure of data containers, such as files on, e.g., disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks, whereas, in the context of a tape environment, the cryptainer may be a tape containing a plurality of tape blocks.

Specifically, the use of a security appliance and cryptainer in a conventional tape environment greatly enhances the security of data stored on a sequential access device, such as a tape or a virtual tape system, by providing a secured storage system for, e.g., archival and/or backup purposes. Here, an initiator issues a write request to store data on the sequential access device. The request is intercepted by the security appliance, which encrypts or compresses and encrypts ("compressed/encrypted") the data associated with the request before forwarding the encrypted or compressed/encrypted data to the device for storage. When access to that data is subsequently desired, the initiator issues a read request that is intercepted by the security appliance and forwarded to the sequential access device. The device retrieves and returns the encrypted or encrypted/compressed data to the security appliance, which restores (i.e., decrypts or decrypts and decompresses ("decrypts/decompresses")) the data prior to returning it to the initiator.

However, the process of retrieving and restoring data that was encrypted or compressed/encrypted by a security appliance for storage in a conventional tape environment is not nearly as efficient as the process used to merely retrieve data from a sequential access device of such an environment. That is, a noted disadvantage of the conventional environment is that passage of the data through the appliance for decryption or decompression/decryption typically introduces latency that can substantially extend the time (e.g., by a factor of 2 to 3) needed to retrieve data from the sequential access device in the absence of the security appliance.

SUMMARY OF THE INVENTION

The disadvantages of the prior art are overcome by providing a system and procedure for reducing the time required to restore encrypted or compressed/encrypted data retrieved from a storage system comprising a sequential access device, such as a tape or a virtual tape system, of a secured tape environment.

A security appliance of the secure tape environment is coupled to the sequential access device and is configured to encrypt or compress/encrypt data provided by an initiator for secure storage on the device. In response to a read request issued by the initiator to access the data, the security appliance cooperates with the sequential access device to retrieve and restore, i.e., decrypt or decrypt/decompress, the data prior to returning it to the initiator. As described herein, the appliance and the device also cooperate to "read ahead" (i.e., retrieve beyond the request) a predetermined amount of additional data for temporary storage on the appliance. Notably, the appliance restores the read ahead data and temporarily stores ("caches") that additional data in anticipation of one or more subsequent read requests for the data from the initiator. The system and procedure of the present invention, thus, reduces the latency associated with restoring data that results from introducing the security appliance in a data path between the initiator and the sequential access device or target.

As an example, assume the initiator issues a first read request to access first data securely stored on the sequential access device. The security appliance intercepts the request and forwards it onto the device. The appliance also forwards a predetermined number of read ahead requests to the device for retrieval of additional (e.g., second and/or third) data. In response to receiving the request, the security appliance restores the first data and returns it to the initiator. The appliance also restores the second and/or third data, and caches that data. When the initiator issues a second read request for the second data, the appliance intercepts and serves that request using the cached data, thereby obviating the need to access the sequential access device. According to the invention, the security appliance may then forward another read ahead request to the device to retrieve further additional (e.g., fourth) data to replace the served data cached by the appliance.

Advantageously, the novel system and method transforms the security appliance into a sequential access caching device that reduces latency associated with restoring secure data in a manner that renders the appliance "invisible" to the initiator.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTIONS OF ILLUSTRATIVE EMBODIMENTS

Figure 1:
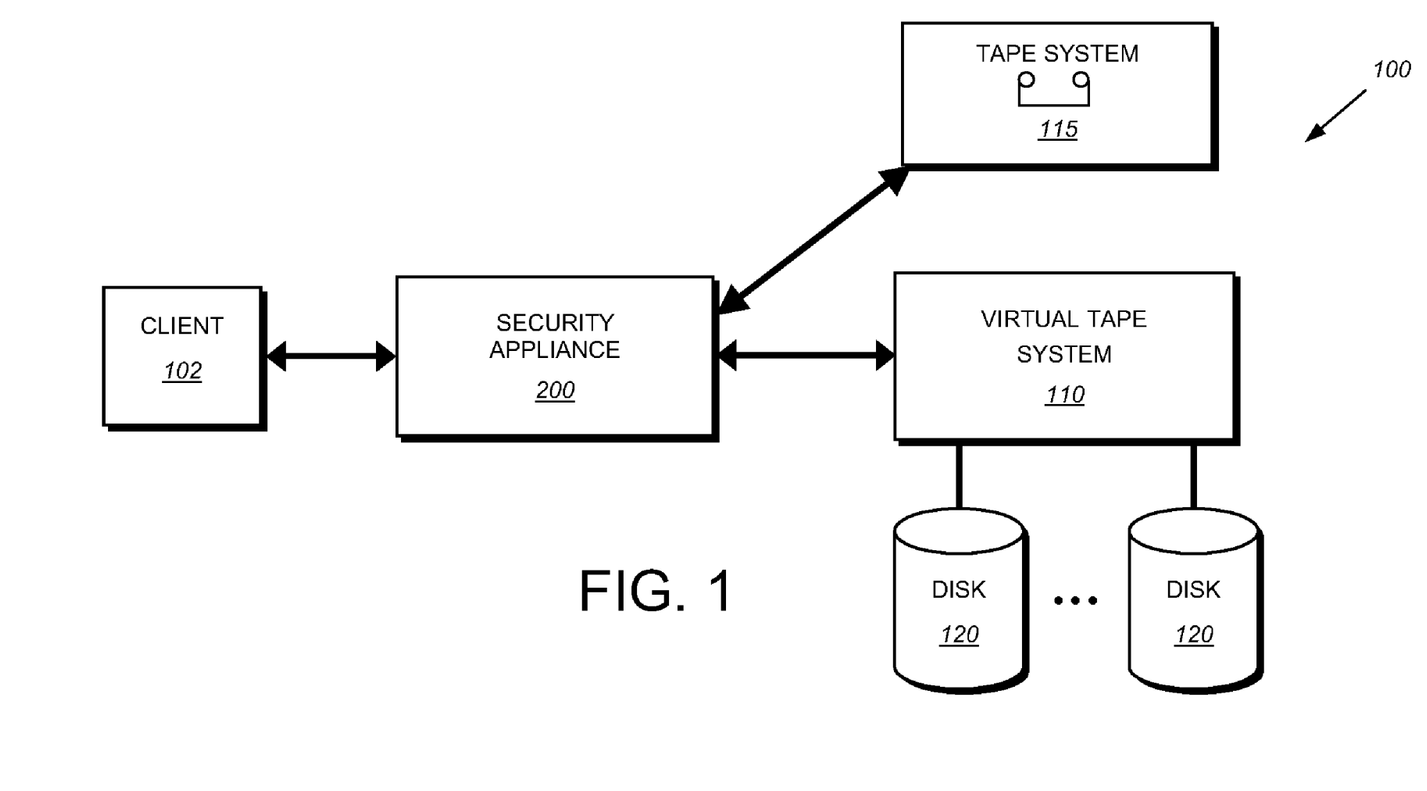
FIG. 1 is a schematic block diagram of an environment including a multi-protocol security appliance in accordance with an illustrative embodiment of the present invention.

FIG. 1 is a schematic block diagram of an environment 100 including a multi-protocol security appliance 200 that may be advantageously used in an illustrative embodiment of the present invention. The security appliance 200 is coupled between one or more clients 102 and one or more storage systems (illustrated in the figures, as a tape system 115 and a virtual tape system 110 (collectively, "sequential access devices") ). The storage system or the sequential access devices 110, 115, illustratively, cooperate with the security appliance 200 to provide secured storage for, e.g., archival and/or backup purposes. As used herein, a virtual tape system is a type of storage that emulates a tape system using disks 120 or other forms of storage media, e.g., non-volatile memory, etc. The security appliance 200 intercepts a data access request issued by a client 102, such as a backup server, and destined for the sequential access device(s) 110, 115, wherein the data access request may be a write request to store data on the device(s), or a read request to retrieve certain data stored on the device(s). In the case of a write request, the security appliance 200 intercepts the request, encrypts or compresses/encrypts the data associated with the request and forwards the encrypted or compressed/encrypted data to the sequential access device(s) 110, 115 for storage. In the case of a read request, the security appliance 200 intercepts the request and forwards it to the sequential access device(s) 110, 115, which return(s) the requested data to the appliance 200 in compressed and encrypted form. The security appliance 200 then decrypts or decrypts/decompresses the data prior to returning it to the client 102.

While the present invention is described in illustrative tape environments 100 wherein clients, such as a backup server, may utilize sequential access devices 110, 115 for archival and/or backup storage, it should be noted that the invention may also apply to non-archival storage implemented on conventional storage systems. That is, the invention may also apply to non-sequential access devices and to instances where the storage environment may comprise one or more regions on a disk that is/are accessible by reference to logical unit numbers (luns). The storage environment may further comprise a collection of files on one or more disks that are accessible, e.g., by reference to time, location, type of by offset through the use of metadata. In addition, the invention may be applicable to non-back end storage environments.

In an illustrative embodiment, the security appliance 200 employs a conventional encryption algorithm, e.g., the Advanced Encryption Standard (AES) or other appropriate algorithms, to transform unencrypted data (cleartext) generated by the client (or initiator) 102 into encrypted data (ciphertext) intended for secure storage, i.e., one or more cryptainers, on the sequential access device(s) (or target(s)) 110, 115. To that end, the security appliance 200 illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs compression and decompression operations, as well as access control, authentication, virtualization, and secure-logging operations.

Figure 2:
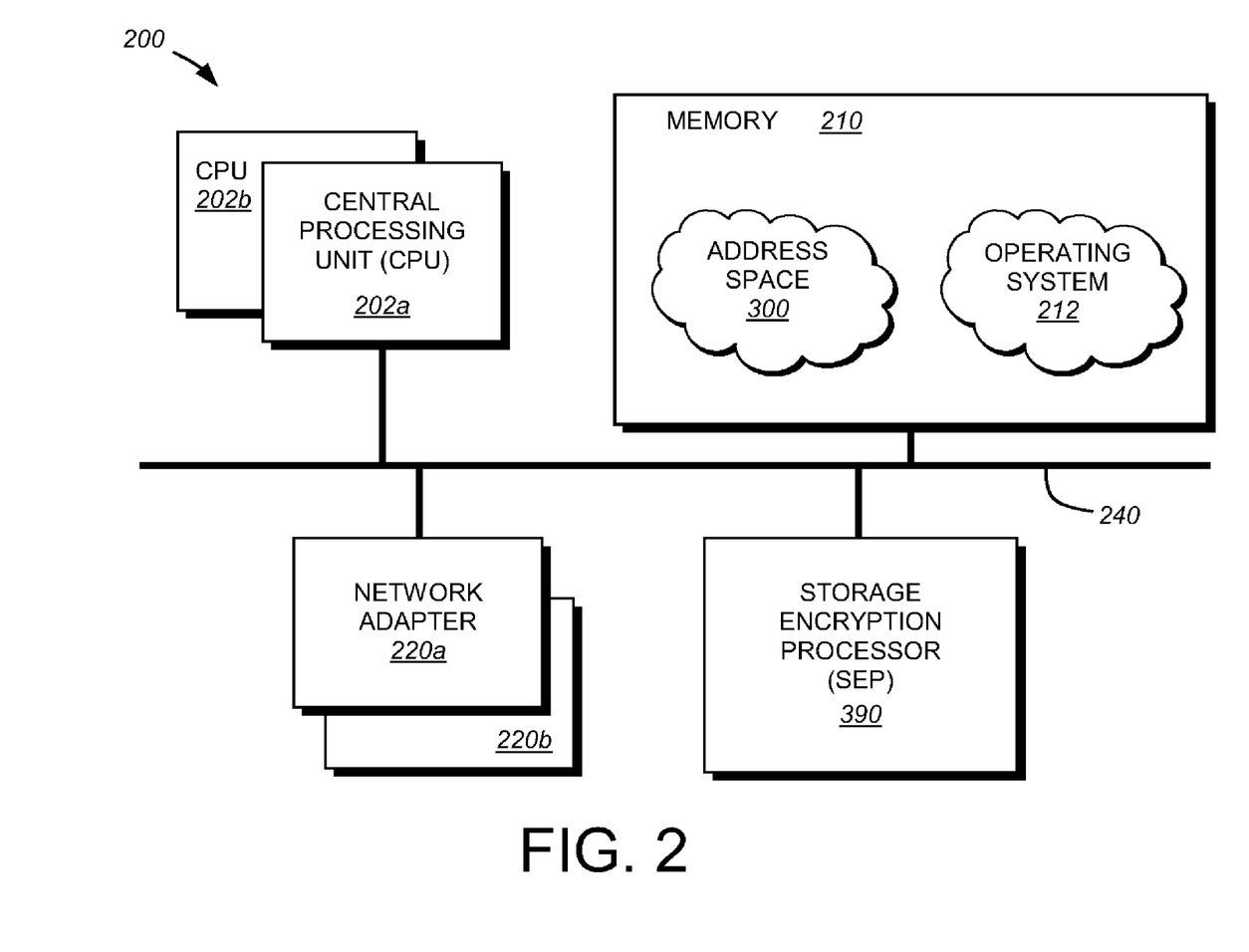
FIG. 2 is a schematic block diagram of a multi-protocol security appliance in accordance with an illustrative embodiment of the present invention.

FIG. 2 is a schematic block diagram of the multi-protocol security appliance 200 in accordance with an illustrative embodiment of the present invention. As used herein, a security appliance 200 denotes a computer having features such as simplicity of security service management for users (system administrators) and clients/initiators of network attached storage (NAS) and storage area network (SAN) deployments. The security appliance 200 comprises one or more processors, e.g., central processing units (CPU 202*a,b*), a memory 210, one or more network adapters 220*a,b*, and a storage encryption processor (SEP 390) interconnected by a system bus 240, such as a conventional Peripheral Component Interconnect (PCI) bus. The SEP 390 is configured to perform all encryption and decryption operations (as well as all compression and decompression operations) for the security appliance in a secure manner; for example, the SEP 390 is configured to protect plaintext encryption keys from system software executing on each CPU 202. Accordingly, the SEP 390 is illustratively embodied as a FIPS 140-2 level-3 certified module that is connected to a dedicated interface card or other similar card.

The network adapters 220 couple the security appliance 200 between one or more clients/initiators 102 and one or more sequential access devices/targets 110, 115 over point-to-point links, wide area networks, and virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
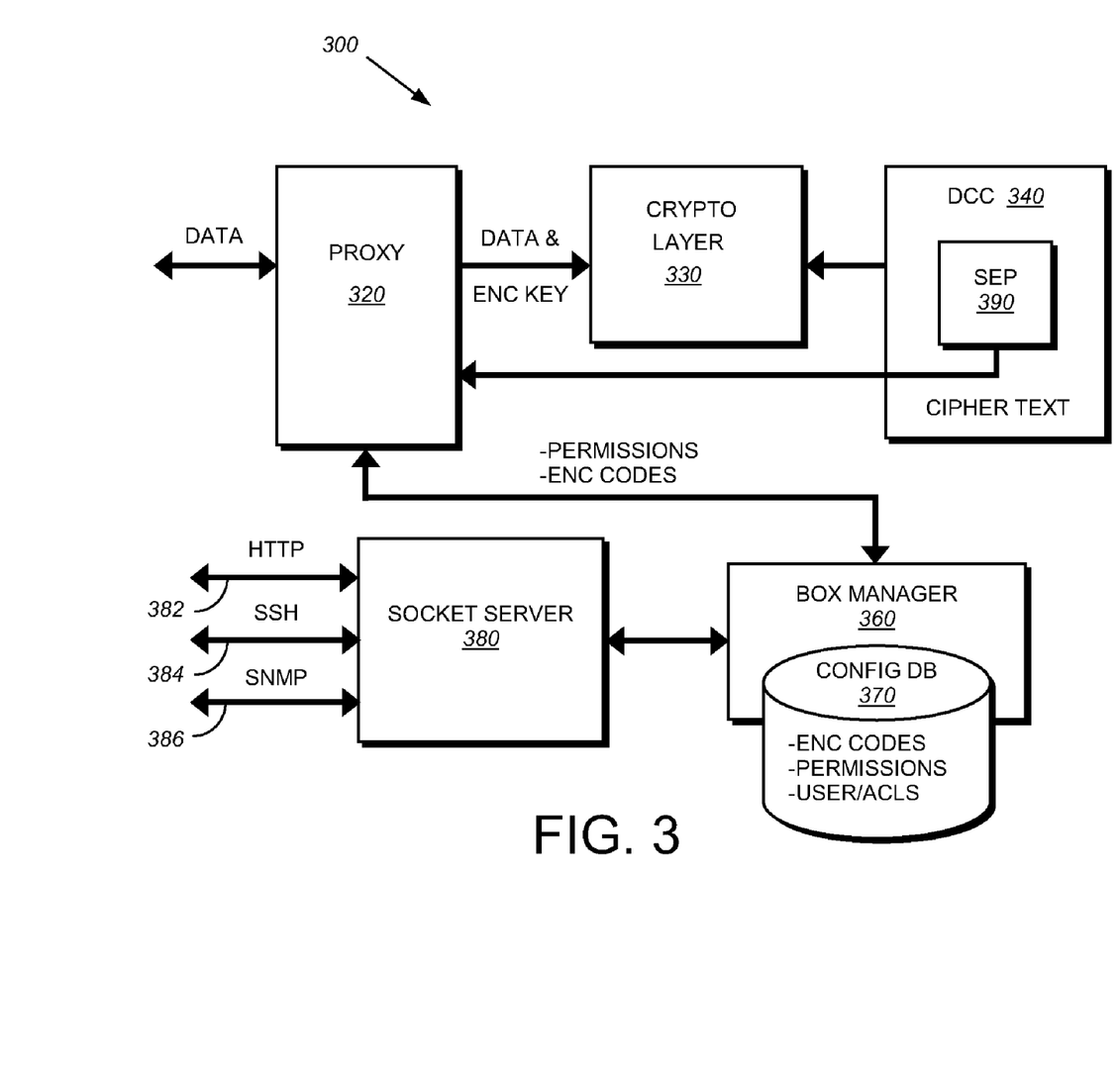
FIG. 3 is a schematic diagram illustrating an arrangement of software processes and modules executing on a security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with an illustrative embodiment of the present invention. In the illustrative embodiment, the operating system software is a customized version of a Unix type operating system, although other operating systems, such as, e.g., Microsoft® Windows® based operating systems, may be used.

For both NAS and SAN environments, data is received at a proxy 320 of the security appliance 200. The proxy 320 is a module embodied as, e.g., a network protocol stack configured to interpret the protocol over which data is received and to enforce certain access control rules based on one or more policies. Thus, for example, the proxy 320 may comprise a FC driver and an SCSI module adapted to implement the FCP protocol. Similarly, the proxy 320 may comprise a TCP/IP protocol stack adapted to implement the TCP/IP protocols. Each policy is served by a box manager 360. The box manager 360 is illustratively embodied as a database application process configured to manage a configuration repository or database (Config DB 370) that stores system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, and also supplies commands to the proxy 320 to activate or deactivate novel read ahead functionality of the present invention. Illustratively, the novel read ahead functionality (e.g., operations) may be globally activated or deactivated by an administrator configuring the box manager 360 via a user interface, such as the CLI and/or GUI. The proxy 320 intercepts data access requests and identifies the sources (clients/initiators 102) of those requests, as well as the types of requests and the storage devices/targets (cryptainers) 110, 115 of those requests. The proxy 320 also queries the box manager 360 for permissions associated with each client/initiator 102 and, in response, the box manager 360 supplies appropriate permissions and encrypted key (e.g., a cryptainer key). The proxy 320 then bundles the data together with the encrypted key and forwards that information to a crypto process (layer) 330 that functions as a "wrapper" for the SEP 390. The SEP 390, illustratively, resides on an interface card, which is hereinafter referred to a data crypto card (DCC 340).

The crypto layer 330 interacts with the DCC 340 by accessing (reading and writing) registers on the DCC 340 and, to that end, functions as a system bus interface. Illustratively, a descriptor queue is used by the crypto layer to access the DCC by, e.g., supplying starting and ending points of data, as well as offsets into the data, identification of the compression algorithm used to compress the data, and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC 340 returns the encrypted data as ciphertext to the proxy 320, which forwards the encrypted data to the sequential access device(s) 110, 115.

Notably, the security appliance 200 "virtualizes" storage such that the appliance appears to a client/initiator 102 as a sequential access device 110, 115 whereas, from the perspective of the sequential access device 110, 115, the security appliance 200 appears as a client/initiator 102. Such virtualization requires that security appliance 200 manipulate network addresses with respect to data access requests and responses. Illustratively, certain customizations to the network protocol stack of the proxy 320 involve virtualization optimizations provided by the appliance 200. In an exemplary embodiment, the security appliance 200 manipulates (changes) the source and destination network addresses of the data access requests and responses. Thus, for example, in a FCP environment, the security appliance 200 manipulates the WWNs of initiators and targets for data access requests and responses.

The present invention is directed to a system and procedure for reducing the time required to restore encrypted or compressed/encrypted data retrieved from a sequential access device 110, 115, such as a tape or a virtual tape system of a secured tape environment.

The security appliance 200 of that environment is coupled to the sequential access device 110, 115 and is configured to encrypt or compress/encrypt data provided by a client/initiator 102 for secure storage on the device/target 110, 115. In response to a read request issued by the client/initiator 102 to access the data, the security appliance 200 cooperates with the sequential access device/target 110, 115 to retrieve and restore, i.e., decrypt or decrypt/decompress, the data prior to returning it to the client/initiator 102. As described herein, the appliance 200 and the device 110, 115 also cooperate to "read ahead" (i.e., retrieve beyond the request) a predetermined amount of additional data for temporary storage on the appliance 200. Notably, the appliance 200 restores the read ahead data and temporarily stores ("caches") that additional data in anticipation of one or more subsequent read requests for the data from the client/initiator 102. The system and procedure of the present invention, thus, reduces the latency associated with restoring data that results from introducing the security appliance 200 in a data path between the client/initiator 102 and a sequential access device/target 110, 115.

As an example, assume the client/initiator 102 issues a first read request to access first data securely stored on the sequential access device/target 110, 115. The security appliance 200 intercepts the request and forwards it onto the device/target 110, 115. The appliance 200 also forwards a predetermined number of read ahead requests to the device/target 110, 115 for retrieval of additional (e.g., second and/or third) data. In response to receiving the request, the security appliance 200 restores the first data and returns it to the client/initiator 102. The appliance 200 also restores the second and/or third data, and caches that data. When the client/initiator 102 issues a second read request for the second data, the appliance 200 intercepts and serves that request using the cached data, thereby obviating the need to access the sequential access device 110, 115. According to the invention, the security appliance 200 may then forward another read ahead request to the device/target 110, 115 to retrieve further additional (e.g., fourth) data to replace the served data cached by the appliance 200.

Note that data provided by a client/initiator 102, including data associated with the read-ahead operations, are encrypted or compressed/encrypted by the security appliance 200, and stored in a sequential access device/target 110, 115 as "blocks".

Figure 4A:
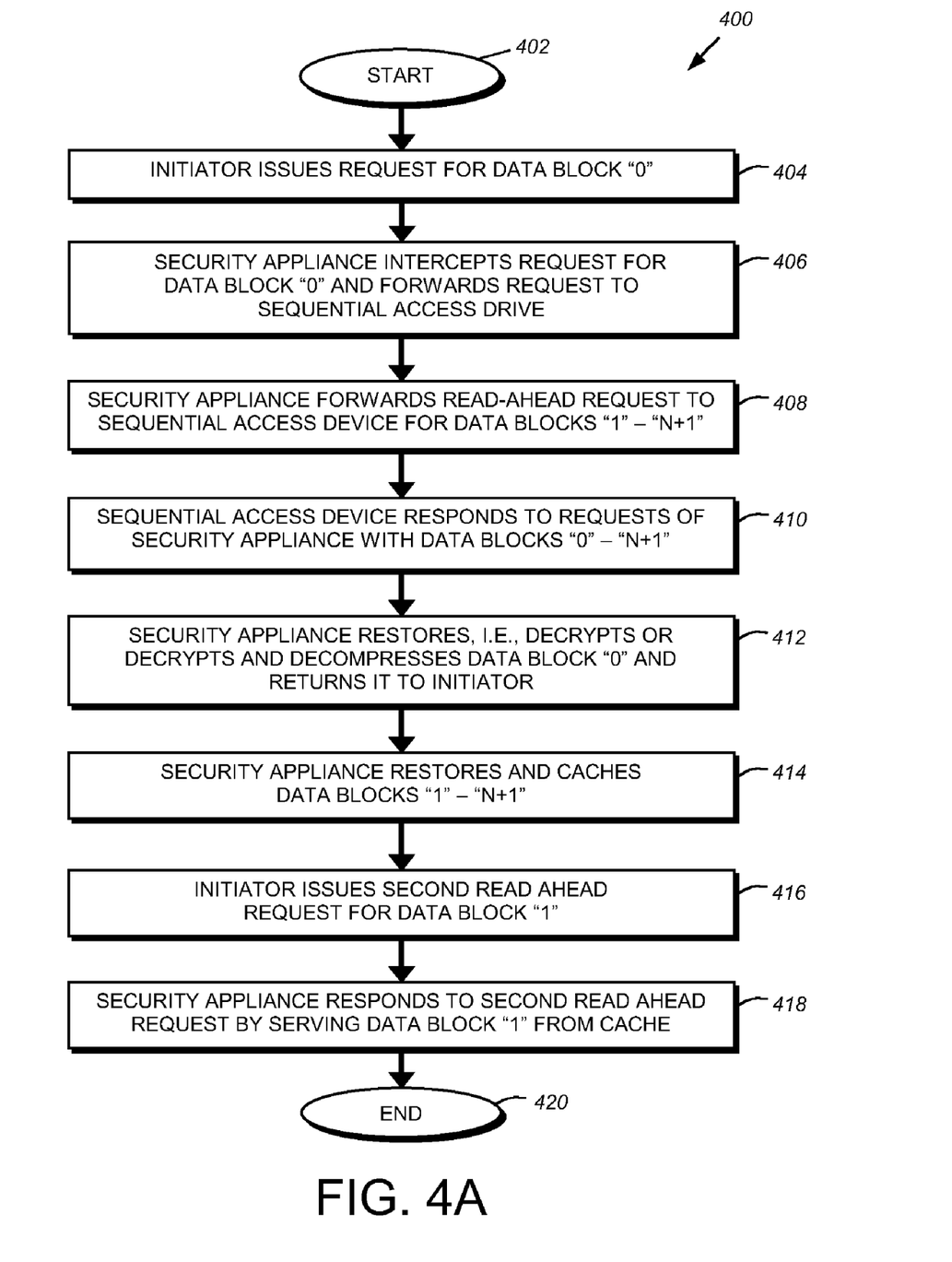
FIG. 4A is a flowchart illustrating the steps of a procedure for performing read ahead operations in a security appliance in accordance with a first illustrative embodiment of the present invention.

FIG. 4A is a flowchart illustrating the steps of a procedure 400 for performing read ahead operations in a security appliance 200 in accordance with a first illustrative embodiment of the present invention. The procedure 400 starts in Step 402 and proceeds to Step 404 where an initiator 102 issues a request for data block "0", i.e., a request for the first data block stored on a sequential access device/target 110, 115. In Step 406, the security appliance 200 intercepts and forwards the request for data block "0" to the sequential access device 110, 115. In Step 408, the security appliance 200 also forwards a read ahead request, i.e., forwards a request to the sequential access device 110, 115 for data blocks "1"-"n+1". In Step 410, the sequential access device 110, 115 responds with data blocks "0"-"n+1". In Step 412, the security appliance 200 restores, i.e., decrypts or decrypts/decompresses, data block "0" and returns it to the initiator 102. In Step 414, the security appliance 200 also decrypts or decrypts/decompresses data blocks "1"-"n+1" and caches that data in memory 210. In Step 416, the initiator 102 issues a second read ahead request for data block "1" and, in Step 418, the security appliance 200 intercepts and responds to that request by serving data block "1" from memory. As data block "1" is already stored in memory 210, the response of the security appliance 200 to that request is made with substantially reduced latency as compared with the latency typically incurred when retrieving and restoring encrypted or compressed/encrypted data stored on device 110, 115.

According to the invention, the security appliance 200 may then forward another read ahead request to the sequential access device 110, 115 to retrieve additional data to replace the served data (data block "1") cached by the appliance 200. Alternatively, the security appliance 200 may defer forwarding additional read ahead requests to the sequential access device/target 110,115 until more of cached data has been served to the client/initiator 102. The procedure 400 then ends at Step 420.

Regardless, it will be understood that where a command, such as a rewind or a fast forward command is issued by the client/initiator 102, the security appliance 200 deletes ("flushes") the cached data in memory 210 because the read location on the sequential access device/target 110, 115 changes. The functionality of the read ahead operation of the present invention may be impacted, moreover, where data blocks progressively increase in size, as the response to the read ahead function may return less that all of the data that may comprise the block of data.

Figure 4B:
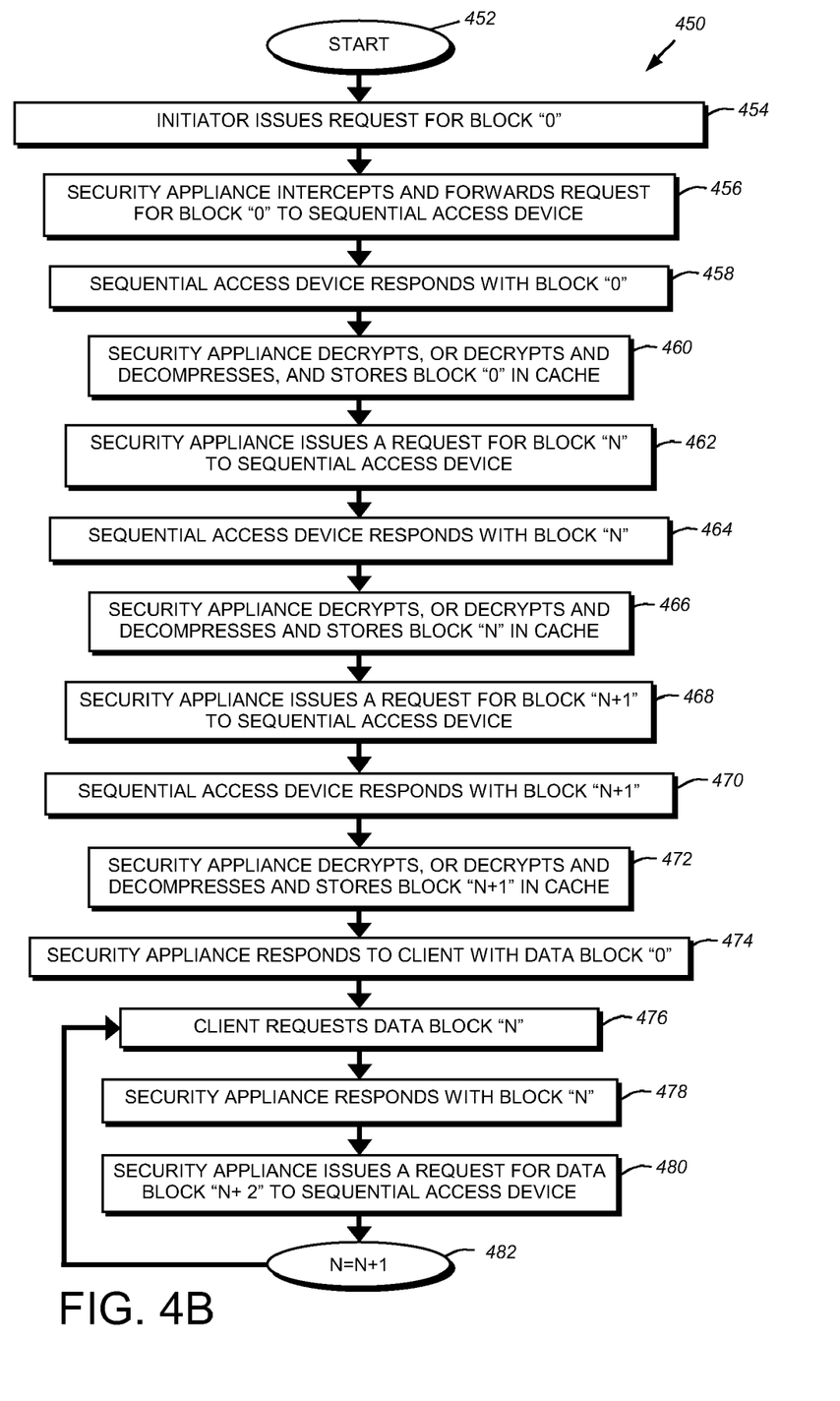
FIG. 4B is a flowchart illustrating the steps of a procedure for performing read ahead operations in a security appliance in accordance with a second illustrative embodiment of the present invention.

FIG. 4B is a flowchart illustrating the steps of a procedure 450 for performing read ahead operations in a security appliance 200 in accordance with a second illustrative embodiment of the present invention. The procedure 450 starts in Step 452 and proceeds to Step 454 where the client/initiator 102 issues a request for data block "0". In Step 456, the security appliance 200 intercepts and forwards the request for data block "0" to the sequential access device 110, 115 and, in Step 458, the sequential access device responds with data block "0". In Step 460, the security appliance 200 decrypts or decrypts and decompresses data block "0" and temporarily stores ("caches") it in memory 210. In Step 462, the security appliance 200 sends a request for data block "n" to the sequential access device and, in Step 464, the sequential access device responds with data block "n". Illustratively, n=1 immediately following the request for block "0". In Step 466, the security appliance decrypts or decrypts/decompresses data block "n" and caches it in memory 210. In Step 468, the security appliance 200 issues a request for data block "n+1" to the sequential access device and, in Step 470, the sequential access device responds with data block "n+1". In Step 472, the security appliance 200 decrypts, or decrypts/decompresses, and caches data block "n+1" in memory 210.

The security appliance 200 then responds to the client's original request in Step 474 with block "0". In Step 476, the client issues a request for block "n" and, in Step 478, the security appliance 200 responds to the client 102 with block "n" while, contemporaneously, sending a request to the storage tape for block "n+2". As data block "n" is already cached in memory 210, the security appliance responds to the request without the latency typically caused by retrieving and restoring, i.e., decrypting or decrypting/decompressing, data stored on the device 110, 115.

Steps 476-480 of procedure 400 are repeated until the security appliance 200 reaches the end of the sequential access device while reading ahead or the client ceases to send additional read requests.

Figure 5:
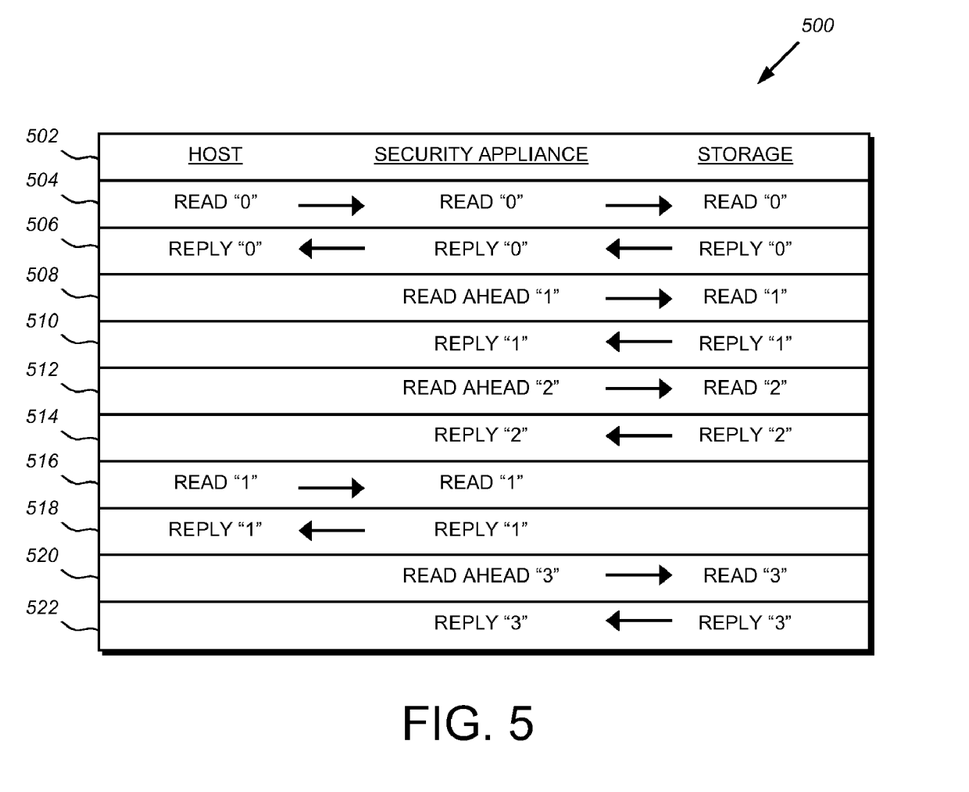
FIG. 5 is a temporal block diagram illustrating an application of the read ahead procedure in accordance with an illustrative embodiment of the present invention.

FIG. 5 is a temporal diagram illustrating another embodiment of a procedure 500 for caching a predetermined number ("x") of restored data blocks of the present invention. In this illustration, the client read request, which is intercepted by the security appliance 200, prompts the issue of a read ahead request for two data blocks from the sequential access device. Thus, x=2 in this illustration. As will be appreciated by this and the illustrations set forth in FIGS. 4A, B, the "x" value provided by proxy module 320 of the security appliance 200 may be modified depending upon factors such as, e.g., the line speed of the data path in the absence of the security appliance 200. Thus, a two block read ahead should be taken as exemplary only.

The procedure 500 illustrated in FIG. 5 starts in Step 504, where the client/initiator 102 issues a read request to the security appliance 200 to read data block "0" from the sequential access device/target 110, 115, and the security appliance 200 forwards the request to the sequential access device. In Step 506, the sequential access device/target 110, 115 responds to the request and conveys data block "0" to the security appliance 200. The security appliance 200, in turn, decrypts and decompresses data block "0" before it returns the data block to the client/initiator 102.

In Step 508, the security appliance 200 contemporaneously issues a read ahead request to the sequential access device/target 110, 115 for data block "1" and, as shown in Step 510, the sequential access device 110, 115 replies by retrieving and conveying data block "1" to the security appliance 200. As the security appliance 200 requested data block "1" in anticipation of receiving a request for this data from the client/initiator 102, in Step 510, data block "1" is cached following decryption or decryption and decompression by the security appliance 200. While processing the reply in Step 510, the security appliance 200 issues another read ahead request to the sequential access device/target 110, 115 for data block "2", as illustrated in Step 512. In Step 514, the sequential access device/target 110, 115 retrieves and conveys data block "2" to the sequential access device 110, 115, where the data block is decrypted or decompressed/decrypted and cached until it is requested by the client 102.

In Step 516, the client 102 issues a read request for data block "1" to the security appliance 200 and, in Step 518, the security appliance 200 replies to the client 102 by returning data block "1" from cache. In Step 520, the security appliance 200 contemporaneously issues a read ahead instruction to the sequential access device/target 110, 115 for the "n+2" data block or, in this case, data block "3". In step 522, the sequential access device 110, 115 retrieves and returns data block "3" to the security appliance 200 in response to that request, whereupon it is decrypted or decompressed/decrypted and cached in memory 210 by the security appliance 200.

Advantageously, the novel system and method transforms the security appliance 200 into a sequential access caching device that reduces latency associated with restoring secure data in a manner that renders the appliance 200 invisible to the client/initiator 102.

While there have been shown and described illustrative embodiment of a system and method for enabling a security appliance to read ahead and rapidly decompress and decrypt from a sequential access device, it is to be understood that various other adaptations and modifications may be made within the spirit and scope of the invention. For example, in the illustrative embodiments herein described, the present invention may be embodied as an element of a security appliance proxy module where the security appliance is a separate component disposed between a one or more clients and one or more sequential access devices. However, the present invention need not reside outside of a sequential access device. That is, the invention may apply to a security appliance which is integrated within a sequential access device or other storage system.

The foregoing description has been directed to specific embodiments of this invention. It will be apparent however that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for reducing latency associated with using a security appliance disposed between an initiator and a target, comprising:
    intercepting, at the security appliance, a first read request received from the initiator for first data securely stored on the target;
    forwarding the first read request from the security appliance to the target;
    issuing a predetermined number of read ahead requests from the security appliance for additional securely stored data on the target;
    receiving at the security appliance, from the target, the first data responsive to the forwarded first read request, restoring the first data at the security appliance and returning the restored first data to the initiator;
    receiving at the security appliance, from the target, the additional securely stored data responsive to the issued predetermined number of read ahead requests;
    restoring the additional securely stored data received at the security appliance in anticipation of the initiator issuing a second read request for the additional securely stored data;
    caching the restored additional securely stored data in a memory of the security appliance;
    intercepting, at the security appliance, the second read request received from the initiator; and
    servicing the second request at the security appliance using the restored additional securely stored data cached in the memory of the security appliance.

2. The method of claim 1, wherein issuing the predetermined number of read ahead requests to the target is performed contemporaneously with issuing the first read request from the security appliance to the target.

3. The method of claim 1, wherein the security appliance is operatively interconnected with the target.

4. The method of claim 1, further comprising issuing a second predetermined number of read ahead requests to the target contemporaneously with responding to the second request.

5. The method of claim 4, further comprising receiving from the target, further additional data responsive to the second predetermined number of read ahead requests, and restoring and caching the further additional data in the memory pending further requests for the further additional data from the initiator.

6. The method of claim 1, wherein the target comprises at least one of a sequential access device, a non-sequential access device, and a non-back end storage device.

7. The method of claim 1 wherein the target comprises a tape device.

8. The method of claim 1 wherein the target comprises a virtual tape device.

9. The method of claim 1, wherein issuing the predetermined number of read ahead requests comprises deferring of the issuing of the predetermined number of read ahead requests until additional cached data is served to the initiator.

10. A system for reducing latency associated with data stored on a target comprising:
 a security appliance configured to be disposed between an initiator and the target, the security appliance further configured to intercept a read request issued by the initiator for the data stored on the target;
 a proxy module of the security appliance configured to forward the read request from the security appliance to the target for the data, and further configured to issue a predetermined number of read ahead requests for additional data stored on the target;
 an encryption processor of the security appliance, configured to restore both the data and the additional data returned from the target in response to the forwarded read request and in response to the issued predetermined number of read ahead requests
 a memory of the security appliance configured to cache the restored data and the restored read ahead data; and
 the security appliance further configured to service, using the restored additional data in the memory, a second request received from the initiator for the additional data.

11. The system of claim 10, wherein the security appliance is further configured to forward the read request contemporaneously with the issued predetermined number of read ahead requests.

12. The system of claim 10, wherein the security appliance is configured to operatively interconnect with the target.

13. The system of claim 10, wherein the security appliance is further configured to issue a second predetermined number of read ahead requests to the target contemporaneously with servicing the second request.

14. The system of claim 13, wherein the security appliance is further configured to receive more data from the target responsive to the second predetermined number of read ahead requests, and further configured to restore and cache the more data in the memory pending a subsequent read requests for the more data from the initiator.

15. The system of claim 10, wherein the target comprises at least one of a sequential access device, a non-sequential access device, and a non-back end storage device.

16. A computer readable medium stored with executable program instructions for execution by a processor, comprising:
 program instructions that intercept, at a security appliance, a first read request received from an initiator for first data securely stored on a target;
 program instructions that forward the first read request from the security appliance to the target;
 program instructions that issue a predetermined number of read ahead requests from the security appliance for additional securely stored data on the target;
 program instruction that receive at the security appliance, from the target, the first data responsive to the forwarded first read request, program instructions that restore the first data at the security appliance, and program instructions that return the restored first data to the initiator;
 program instructions that receive at the security appliance, from the target, the additional securely stored data responsive to the issued predetermined number of read ahead requests;
 program instructions that restore the additional securely stored data received at the security appliance in response to the issued predetermined number of read ahead requests; and
 program instructions that cache the restored additional securely stored data in a memory of the security appliance.

17. The computer readable medium of claim 16, wherein the program instructions that issue the predetermined number of read ahead requests to the target are performed contemporaneously with the program instruction that forward the first read request from the security appliance to the target.

18. The computer readable medium of claim 16, further comprising program instructions that serve a second request for data issued from the initiator from the additional securely stored data cached in the memory of the security appliance, thereby obviating the need to access the target responsive to the second request issued by the initiator.

19. The computer readable medium of claim 18, further comprising program instructions that issue a second predetermined number of read ahead requests to the target contemporaneously with the program instruction that respond to the second request.

20. The computer readable medium of claim 19, further comprising program instructions that receive from the target, further additional data responsive to the second predetermined number of read ahead requests, and program instructions that restore and program instructions that cache the further additional data in the memory pending further requests for the further additional data from the initiator.

* * * * *

UNITED STATES PATENT AND TRADEMARK OFFICE
CERTIFICATE OF CORRECTION

PATENT NO. : 8,122,196 B2  
APPLICATION NO. : 11/554131  
DATED : February 21, 2012  
INVENTOR(S) : Ian Jen-Hao Chang Page 1 of 1

It is certified that error appears in the above-identified patent and that said Letters Patent is hereby corrected as shown below:

In col. 12, line 2 should read:
data in the memory pending a subsequent read request[[s]] for the Signed and Sealed this
Thirteenth Day of November, 2012

David J. Kappos
*Director of the United States Patent and Trademark Office*